(12) United States Patent
Poupyrev et al.

(10) Patent No.: US 9,024,889 B2
(45) Date of Patent: May 5, 2015

(54) INFORMATION PRESENTING DEVICE, TACTILE SENSE PRESENTING METHOD, AND PROGRAM

(75) Inventors: Ivan Poupyrev, Tokyo (JP); Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 621 days.

(21) Appl. No.: 13/070,922

(22) Filed: Mar. 24, 2011

(65) Prior Publication Data

US 2011/0248962 A1    Oct. 13, 2011

(30) Foreign Application Priority Data

Apr. 7, 2010  (JP) .................................. 2010-088281

(51) Int. Cl.
  *G06F 3/041*  (2006.01)
  *G06F 3/01*  (2006.01)
(52) U.S. Cl.
  CPC ...................................... *G06F 3/016* (2013.01)
(58) Field of Classification Search
  USPC ......... 345/173–174, 176, 178; 178/18.01–18, 178/9
  See application file for complete search history.

(56) References Cited

U.S. PATENT DOCUMENTS

| | | | |
|---|---|---|---|
| 2005/0052425 A1* | 3/2005 | Zadesky et al. | 345/173 |
| 2007/0008299 A1* | 1/2007 | Hristov | 345/173 |
| 2007/0080951 A1* | 4/2007 | Maruyama et al. | 345/173 |
| 2007/0188179 A1* | 8/2007 | Deangelis et al. | 324/661 |
| 2009/0046078 A1* | 2/2009 | Kent | 345/176 |
| 2009/0058829 A1* | 3/2009 | Kim et al. | 345/173 |
| 2009/0262091 A1* | 10/2009 | Ikeda et al. | 345/173 |
| 2010/0156822 A1* | 6/2010 | Lee et al. | 345/173 |

FOREIGN PATENT DOCUMENTS

JP    2004-94389    3/2004

* cited by examiner

*Primary Examiner* — Shaheda Abdin

(74) *Attorney, Agent, or Firm* — Oblon, McClelland, Maier & Neustadt, L.L.P.

(57) ABSTRACT

An information presenting device of present invention includes a conductive layer to which an AC voltage is applied, an insulating layer for covering the conductive layer and presenting a tactile sense when a part of a body of a user set to a ground potential is in contact with the insulating layer.

18 Claims, 7 Drawing Sheets

INFORMATION PRESENTING DEVICE, TACTILE SENSE PRESENTING METHOD, AND PROGRAM

BACKGROUND OF THE INVENTION

1. Field of the Invention

The present invention relates to an information presenting device, a tactile sense presenting method, and a program.

2. Description of the Related Art

As disclosed in Japanese Patent Application Laid-Open No. 2004-94389 in the related art, a device that provides a user with a tactile sense by a piezoelectric actuator in a display using a touch panel is known.

SUMMARY OF THE INVENTION

However, technology disclosed in Japanese Patent Application Publication No. 2004-94389 has a problem in that a device configuration is complex and also fabrication cost is increased since the tactile sense is provided by the piezoelectric actuator.

In light of the foregoing, it is desirable to provide a novel and improved information presenting device, tactile sense presenting method, and program that can present a tactile sense to a user by a simple configuration.

According to an embodiment of the present invention, there is provided an information presenting device includes a conductive layer to which an AC voltage is applied, an insulating layer for covering the conductive layer and presenting a tactile sense when a part of a body of a user set to a ground potential is in contact with the insulating layer.

In this configuration, the information presenting device further includes a display unit, which is arranged integrally with or separately from a stack structure including the conductive layer and the insulating layer and displays information.

In this configuration, the information presenting device further includes a position sensor for detecting a position of the part of the body of the user on the insulating layer.

In this configuration, the position sensor detects the position of the part of the body of the user on the basis of variation of electrostatic capacitance generated in the conductive layer when the part of the body of the user is close to or in contact with the insulating layer.

In this configuration, the information presenting device further includes a tactile control module for controlling an amplitude or frequency of the AC voltage applied to the conductive layer.

In this configuration, the information presenting device further includes a position sensor for detecting a position of the part of the body of the user on the insulating layer, and a tactile control module for controlling an amplitude or frequency of the AC voltage applied to the conductive layer on the basis of the position of the part of the body of the user.

In this configuration, the stack structure including the conductive layer and the insulating layer is formed of a transparent material and is arranged to cover a display surface of the display unit.

In this configuration, the position sensor detects the position of the part of the body of the user by optical detection.

In this configuration, the information presenting device further includes a pressure-sensitive sensor for detecting pressure force when the part of the body of the user is in contact with the insulating layer.

In this configuration, a stack structure including the conductive layer and the insulating layer is formed in a planar shape extending in a two-dimensional direction.

In this configuration, a stack structure including the conductive layer and the insulating layer is formed in a stripe shape or a line shape extending in a one-dimensional direction.

In this configuration, a stack structure including the conductive layer and the insulating layer is formed of a deformable material.

In this configuration, the information presenting device further includes an electrode unit to which the ground potential is applied, a potential of the user is set commonly with the ground potential of the electrode unit.

In this configuration, the information presenting device further includes a battery for driving at least the display unit, a ground potential of the battery is connected to the body of the user.

According to another embodiment of the present invention, there is provided a tactile sense presenting method for use in an information presenting device having a conductive layer and an insulating layer, which covers the conductive layer and is in contact with a part of a body of a user set to a ground potential. The method includes the steps of applying an AC voltage to the conductive layer, detecting a position of the part of the body of the user on the insulating layer, and controlling an amplitude or frequency of the AC voltage applied to the conductive layer on the basis of the position of the part of the body of the user.

According to another embodiment of the present invention, there is provided a tactile sense presenting method for use in an information presenting device having a conductive layer, an insulating layer, which covers the conductive layer and is in contact with a part of a body of a user set to a ground potential, and a display unit, which is arranged integrally with or separately from a stack structure including the conductive layer and the insulating layer and displays information. The method includes the steps of applying an AC voltage to the conductive layer, detecting a position of the part of the body of the user on the insulating layer, and controlling an amplitude or frequency of the AC voltage applied to the conductive layer on the basis of the position of the part of the body of the user.

According to another embodiment of the present invention, there is provided a program in an information presenting device including a conductive layer and an insulating layer, which covers the conductive layer and is in contact with a part of a body of a user set to a ground potential. The program causes a computer to function as a portion for applying an AC voltage to the conductive layer, a portion for detecting a position of the part of the body of the user on the insulating layer; and a portion for controlling an amplitude or frequency of the AC voltage applied to the conductive layer on the basis of the position of the part of the body of the user.

According to another embodiment of the present invention, there is provided a program in an information presenting device including a conductive layer, an insulating layer, which covers the conductive layer and is in contact with a part of a body of a user set to a ground potential, and a display unit, which is arranged integrally with or separately from a stack structure including the conductive layer and the insulating layer and displays information. The program causes a computer to function as a portion for applying an AC voltage to the conductive layer, a portion for detecting a position of the part of the body of the user on the insulating layer, and a portion for controlling an amplitude or frequency of the AC voltage applied to the conductive layer on the basis of the position of the part of the body of the user.

According to the present invention, it is possible to provide an information presenting device, a tactile sense presenting method, and a program that can present a tactile sense to a user by a simple configuration.

BRIEF DESCRIPTION OF THE DRAWINGS

FIG. 3 is a schematic diagram showing an example in which a touch panel is arranged on a display panel including a liquid crystal display panel or the like;

DETAILED DESCRIPTION OF THE EMBODIMENT(S)

Figure 1:
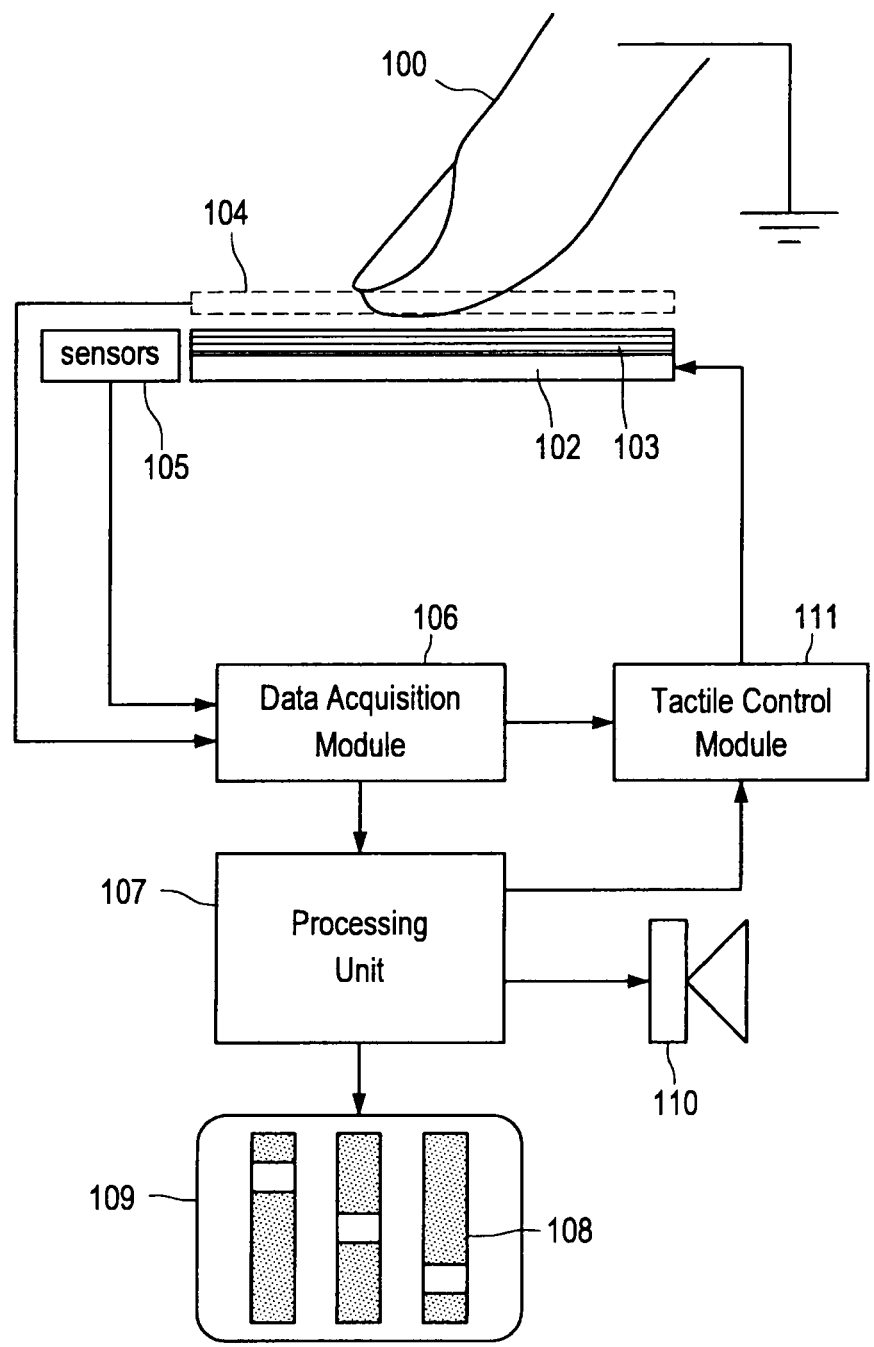
FIG. 1 is a diagram schematically showing a configuration of an information presenting device according to an embodiment of the present invention.

Hereinafter, preferred embodiments of the present invention will be described in detail with reference to the appended drawings. In this specification and the drawings, elements having substantially the same functional configurations are denoted by the same reference numerals, and redundant description thereof is omitted.

Description will be given in the following order.
1. Configuration Example of Information Presenting Device
2. Main Configuration for Generating Tactile Sense
3. Specific Configuration of Information Presenting Device
4. Example in which Main Configuration for Generating Tactile Sense is Provided in One-dimensional Direction
5. Configuration Example of Video Projecting System
6. Configuration Example of External Appearance of Information Presenting Device

[1. Configuration Example of Information Presenting Device]

First, a schematic configuration of an information presenting device 10 according to an embodiment of the present invention will be described with reference to FIG. 1. FIG. 1 is a diagram schematically showing the configuration of the information presenting device 10. For example, the information presenting device 10 is an electronic device, such as a mobile device such as a personal digital assistant (PDA) or a mobile phone, or a remote controller for manipulating a television set. As shown in FIG. 1, the information presenting device 10 according to this embodiment includes a conductive layer 102, an insulating layer 103, a position sensor 104, various sensors 105, a data acquisition module 106, a processing unit 107, a display unit 109, a speaker 110, and a tactile control module 111. The display unit 109 includes a panel such as a liquid crystal display (LCD) panel on which icons 108 serving as user interfaces are displayed.

A stack structure including the conductive layer 102, the insulating layer 103, and the position sensor 104 is shown separately from the display unit 109, in FIG. 1, but the stack structure including the conductive layer 102, the insulating layer 103, and the position sensor 104 can be stacked on a display screen of the display unit 109. The stack structure including the conductive layer 102, the insulating layer 103, and the position sensor 104 may be provided in a position separated from the display unit 109.

For example, the position sensor 104 is a touch panel type of sensor, which detects a motion of a user's finger 100 and a position of the finger 100. In this embodiment, an example using electrostatic capacitance is illustrated as the position sensor 104, but the present invention is not limited thereto. The various sensors 105 include various types of sensors such as a pressure-sensitive sensor, which senses pressure force by the user's finger 100, a sensor detecting a tilt operation, and the like. Information acquired by the position sensor 104 or the various sensors 105 is acquired in the data acquisition module 106 and is further transmitted to the processing unit 107.

The processing unit 107 is a component that controls the entire information presenting device 10, and includes a central processing unit such as a microprocessor, a CPU, or the like. The processing unit 107 calculates inputs from the position sensor 104 or the various sensors 105, and controls a user interface such as the icon 108 displayed on the display unit 109 or the speaker 110 in response to a state of an application or the user interface. Specifically, the processing unit 107 controls display content of the display unit 109, or controls a sound output by the speaker 110, on the basis of touch panel manipulation, pressing manipulation, or the like by the user using the position sensor 104.

Simultaneously, the processing unit 107 outputs a command to the tactile control module 111 so that a periodic signal (alternating current (AC) voltage) is applied to the conductive layer 102. The tactile control module 111 is connected to the conductive layer 102. The tactile control module 111 applies the AC voltage to the conductive layer 102 on the basis of the command of the processing unit 107. In this case, the processing unit 107 outputs a command, which controls an amplitude and frequency of the AC voltage, to the tactile control module 111 on the basis of inputs acquired by the data acquisition module 106 from the position sensor 104 and the various sensors 105. In the configuration shown in FIG. 1, the configurations of the data acquisition module 106 and the tactile control module 111 may be included in the processing unit 107. A program (software) for causing the processing unit 107 to function can be stored in a memory (not shown) provided in the information presenting device 10 or a recording medium such as a memory connected from the outside.

The user's finger 100 inputs manipulation information by making contact with an upper side of the position sensor 104. If the finger 100 is in contact with the upper side of the position sensor 104, the position sensor 104 detects a position of the finger 100.

The user's finger 100 has a ground potential. Thus, a user's body is connected to an electrode for the ground potential, or the like. The conductive layer 102 is covered by the insulating layer 103 and is configured so that the user's finger 100 is not in contact with the conductive layer 102. In a state in which the user's finger 100 has the ground potential, the user's finger 100 feels a tactile sense like a small vibration if the user moves the position of the finger 100 on the insulating layer 103.

[2. Main Configuration for Generating Tactile Sense]

Figure 2:
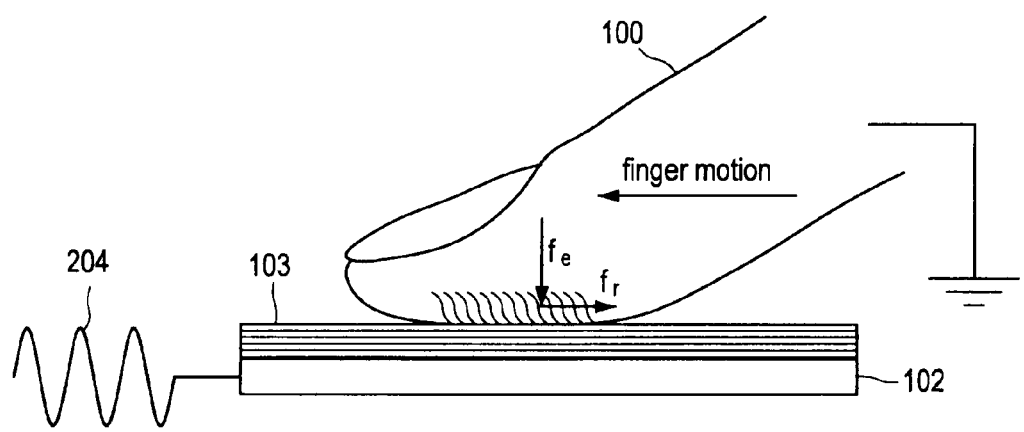
FIG. 2 is a schematic diagram showing a main configuration for generating a tactile sense on a finger of a user.

FIG. 2 is a schematic diagram showing a main configuration for generating a tactile sense on the user's finger 100. As shown in FIG. 2, the insulating layer 103 is stacked on the conductive layer 102 and an AC voltage is applied to the conductive layer 102. On the other hand, the user's finger has the ground potential. In this state, if the user moves the position of the finger 100 while the finger 100 is in contact with an upper side of the insulating layer 103, the skin of the finger 100 in contact with a surface of the insulating layer 103 is stretched in response to the motion of the finger 100 by frictional force fr between the finger 100 and the insulating layer 103. In this state, if a periodic voltage (AC voltage) having a sufficient voltage value is applied to the conductive layer 102, attractive force fe is generated between the finger 100 and the conductive layer 102 located on its lower layer and the frictional force fr is increased. An amplitude of the attractive force fe is varied in response to a voltage value, and the frictional force fr is also periodically varied. As a result, since a tip end of the finger 100 in contact with the insulating layer 103 is fixed to the insulating layer 103 when the frictional force fr is large, the skin is stretched. When the frictional force fr is small, the finger 100 is in a "stick slip" state in which the skin is recovered from the stretching so that the tip end slips on the surface of the insulating layer 103. Accordingly, the user feels a tactile sense such as a vibration. This tactile sense can be controlled by controlling the amplitude and frequency of a signal 204 (AC voltage) applied from the tactile control module 111 to the conductive layer 102. It is possible to vary the friction force fr and generate interfaces based on many different tactile senses by controlling the amplitude and frequency of the AC voltage.

In this embodiment, information is fed back to the user by a tactile sense by controlling the amplitude and frequency at which the tactile sense is presented to the user in response to input manipulation by the user or a current state of a user interface or application using this phenomenon. For example, if the configuration shown in FIG. 2 is provided on the display unit 109, the position of the finger 100 is recognized by the tactile sense by presenting the tactile sense to the user when the user's finger 100 moves to a predetermined position on the display unit 109.

For example, a command is output from the processing unit 107 to the tactile control module 111 when the icon 108 is displayed in a specific position of the display unit 109 and the user's finger 100 is located on the icon 108. The tactile control module 111 presents the tactile sense to the user's finger 100 by applying an AC voltage to the conductive layer 102 on the basis of the above-described command. Thereby, the user can recognize the fact that the user's fingertip 100 is located on the icon 108 without viewing a display screen.

On the basis of the command of the processing unit 107, the tactile control module 111 controls a voltage so that the amplitude or frequency of the AC voltage is increased when the user's finger 100 is close to the icon 108. Thereby, a stronger tactile sense is presented to the user's finger 100 when the user's finger 100 is closer to the icon 108. Through the tactile sense, the user can recognize whether or not a fingertip is close to the icon 108 while moving the finger 100 on the display screen.

When information is fed back to the user in addition to the tactile sense, it is possible to display the information on the display screen of the display unit 109 and perform a sound output of the information by the speaker 110.

[3. Specific Configuration of Information Presenting Device]

Figure 3:
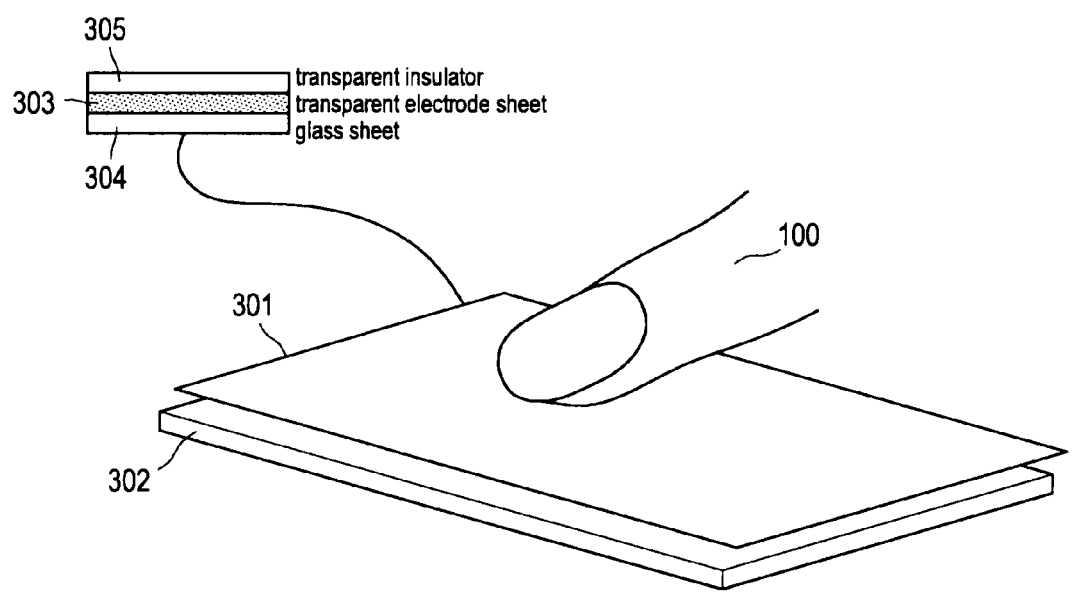

Next, a specific configuration of the information presenting device 10 of this embodiment will be described. FIG. 3 is a schematic diagram showing an example in which a touch panel 301 is arranged on a display panel 302 including an LCD panel or the like. The touch panel 301 is an electrostatic capacitance type and is constituted by stacking a thin sheet of glass (glass sheet) 304, a transparent electrode sheet 303, and a transparent insulator 305 in order from the bottom. The touch panel 301 has a planar shape, which is a rectangular shape such as a square, a rectangle, or the like. Electrodes are connected to four corners of the electrode sheet 303. If the user's finger 100 is in contact with an upper side of the insulator 305, the electrostatic capacitance with the electrode sheet 303 is varied and the electrostatic capacitance is varied in each electrode according to a position of the user's finger 100. Thus, the position of the user's finger 100 can be detected in response to the electrostatic capacitance detected by each electrode. That is, the touch panel 301 corresponds to the position sensor 104 shown in FIG. 1. The display panel 302 corresponds to the display unit 109 shown in FIG. 1.

Figure 8A:
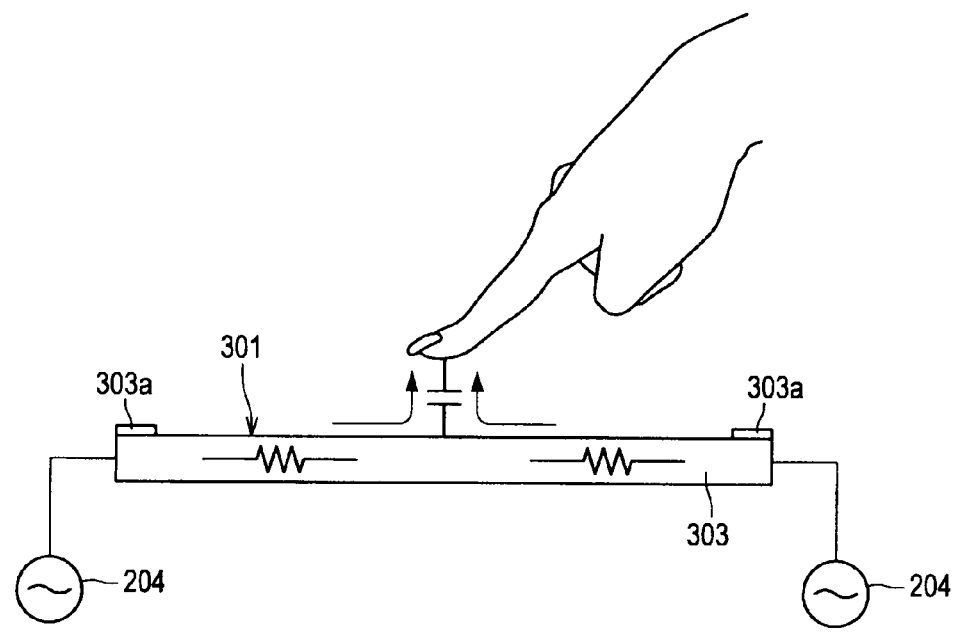
FIGS. 8A and 8B are schematic diagrams showing a method of detecting a finger based on the variation of electrostatic capacitance in detail.
Figure 8B:
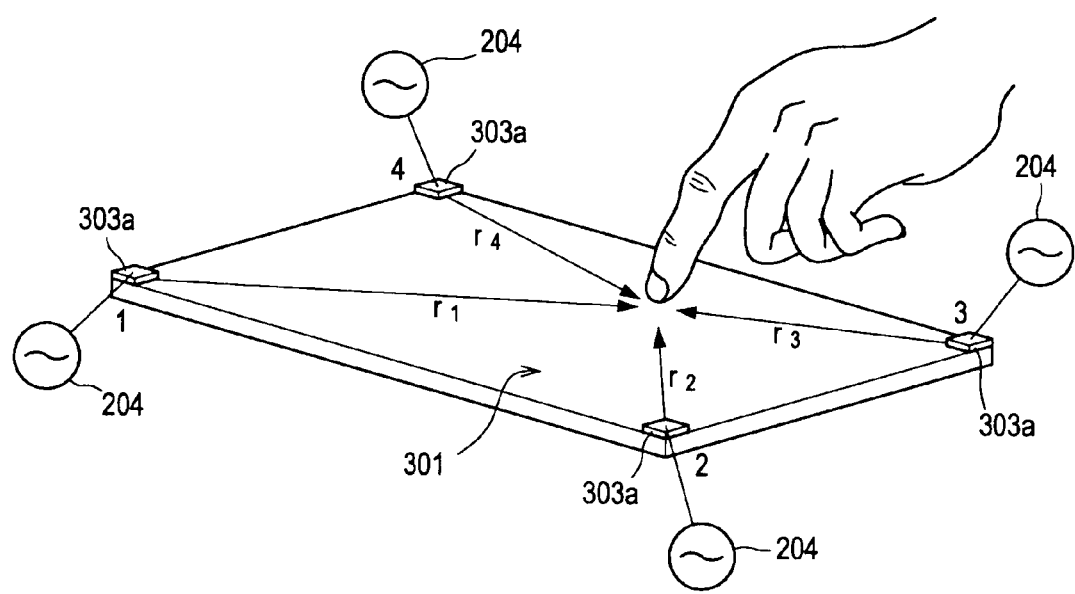

FIGS. 8A and 8B are schematic diagrams showing a method of detecting the finger 100 on the basis of the variation of electrostatic capacitance in detail. Here, FIG. 8A shows a state when an appearance in which the user's finger 100 is close to the electrode sheet 303 is viewed from the side, and FIG. 8B is a state viewed obliquely from above. As shown in FIG. 8A, electrodes 303a are provided on four corners of the electrode sheet 303 of the touch panel 301. If the user's finger 100 is in contact with the panel surface in a state in which an AC voltage is applied to the transparent electrode sheet 303, a capacitor 310 as shown in FIG. 8A can be assumed to be coupled between a tip end of the user's finger 100 and the transparent electrode sheet 303. Thus, the AC voltage applied to the electrode sheet 303 flows from the electrode 303a to the user's finger 100 through the transparent electrode sheet 303.

At this time, the user's finger 100 is in contact with a certain position on the electrode layer 303 of the touch panel 301 as shown in FIG. 8B. Resistance values of the transparent electrodes (indicated by r1 to r4 in FIG. 8B) are varied according to distances between the position of the finger 100 and the electrodes 303a provided on the four corners. Thus, values of currents flowing through the electrodes 303a of the four corners are varied in response to variations of the resistance values r1 to r4. It is possible to detect a position on the touch panel 301 in contact with the finger 100 by measuring the values of the currents flowing through the electrodes 303a.

In the configuration shown in FIG. 3, the electrode sheet 303 corresponds to the conductive layer 102 of FIG. 1, and the insulator 305 corresponds to the insulating layer 103 of FIG. 1. The tactile control module 111 is connected to the electrode sheet 303, and an AC voltage is applied to the electrode sheet 303 by the tactile control module 111. Thereby, if the user moves the finger 100 in a state in which the finger 100 is in contact with the surface of the touch panel 301, the user's finger 100 can feel a tactile sense as described with reference to FIG. 2.

The processing unit 107 controls the tactile control module 111 in response to the position of the user's finger 100 detected by the touch panel 301. The processing unit 107 acquires position information of the icon 108 displayed on the display panel 302, and controls the AC voltage applied from the tactile control module 111 to the electrode sheet 303 on the basis of the position information of the user's finger 100 obtained from the touch panel 301. Thereby, it is possible to vary information of the tactile sense generated on the user's finger 100 in response to the position of the user's finger 100 as described above.

If an electrostatic capacitance type of touch panel 301 is used as described above, it is possible to perform both of the detection of the position of the finger 100 and the feedback of the tactile sense using the same electrode sheet 303. This is because an order is different in that a frequency range upon position detection by the electrostatic capacitance type of touch panel 301 is about several hundred kHz, while a frequency range for feeding back the tactile sense is about several hundred Hz.

Figure 4:
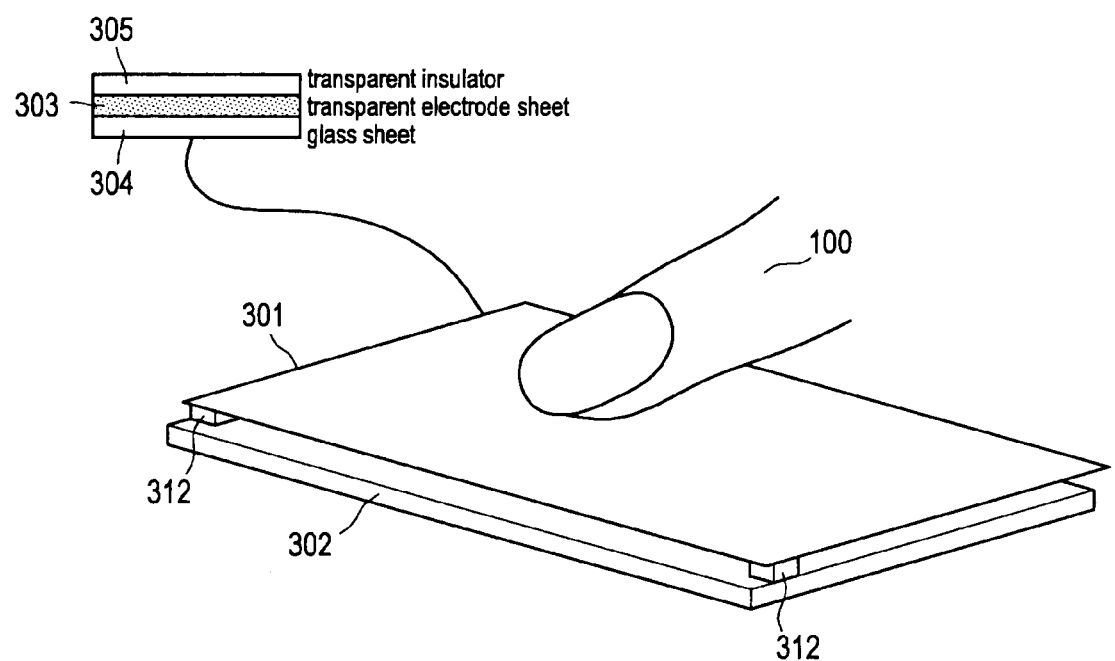
FIG. 4 is a schematic diagram showing another example of a specific configuration of an information presenting device.

FIG. 4 is a schematic diagram showing another example of a specific configuration of the information presenting device 10. In the example shown in FIG. 4, pressure-sensitive sensors 312 are arranged on the display panel 302, and the touch panel 301 described with reference to FIG. 3 is arranged on the pressure-sensitive sensors 312. That is, in the example shown in FIG. 4, the pressure-sensitive sensors 312 are interposed between the display panel 302 and the touch panel 301 for the configuration of FIG. 3. The pressure-sensitive sensors 312 are arranged, for example, on four corners on the display panel 302, but the present invention is not limited thereto.

In the configuration shown in FIG. 4, the pressure-sensitive sensors 312 correspond to one of the various sensors 105 shown in FIG. 1. If the user's finger is in contact with the surface of the touch panel 301 as described above, the electrostatic capacitance with the electrode sheet 303 of the touch panel 301 is varied and the electrostatic capacitance detected by each electrode of the electrode sheet 303 is varied in response to the position of the user's finger 100. Thus, the position of the user's finger 100 can be detected in response to the electrostatic capacitance detected by each electrode.

As in FIG. 3, the tactile control module 111 is connected to the electrode sheet 303, and an AC voltage is applied to the electrode sheet 303 by the tactile control module 111. Thereby, if the user moves the finger 100 in a state in which the finger 100 is in contact with the surface of the touch panel 301 as described with reference to FIG. 2, the user's finger 100 can feel a tactile sense.

The pressure-sensitive sensor 312 is a sensor that senses pressure force when the touch panel 301 is pressed by the user's finger 100. The user recognizes whether or not a fingertip is located on the icon 108 by the tactile sense of the finger 100. If the fingertip is located on the icon 108, its function is realized by pressing the icon 108. In this case, the pressure-sensitive sensor 312 senses that the icon 108 is pressed by the user, and transmits its information to the processing unit 107. Thereby, the processing unit 107 recognizes that the icon 108 is pressed, and executes predetermined processing to be executed when the icon 108 is pressed. As the processing when the icon 108 is pressed, various types of processing such as displaying of a new display screen, scrolling of a screen, starting of an application, and the like can be applied.

The touch panel 301 is used to detect the position of the finger 100 in the examples of FIGS. 3 and 4, but a position detection method is not limited thereto. For example, an optical sensor may be used. In this case, it is possible to use a position sensor by laser light, an infrared position sensor, a sensor by a camera (image processing), or a method similar thereto.

The configuration in which the electrode sheet 303 and the insulator 305 of the touch panel 301 are formed of transparent materials and are provided to overlap each other on the display panel 302 has been mainly described in the above-described example, but the touch panel 301 is not limited to the transparent materials. For example, a non-transparent touch sensor may be used as in a general touch pad of a laptop personal computer, and the touch sensor may be provided in a position separated from the display panel 302. Even in this case, it is possible to present a tactile sense to the user's finger 100 by applying an AC voltage to a conductive layer of the touch sensor as described above.

[4. Example in which Main Configuration for Generating Tactile Sense is Provided in One-Dimensional Direction]

An example in which a motion direction of the user's finger 100 is assumed to be a two-dimensional plane has been described above, but the motion direction may be a one-dimensional direction. FIG. 5A shows an example in which a conductive layer 402 extending in a one-dimensional direction is provided within an insulating layer 103 including a stripe-like resin sheet or the like. In FIG. 5A, a position sensor 403, which detects a position of a fingertip, is provided on the insulating layer 103. As in FIG. 1, the finger 100 has a ground potential and an output of the position sensor 403 is transmitted to the processing unit 107. An AC voltage is applied from the tactile control module 111 to the conductive layer 402. In response to a position of the user's finger 100 detected by the position sensor 403, the processing unit 107 controls the application of the AC voltage to the conductive layer 402 by the tactile control module 111. If the user moves the finger 100 along the conductive layer 402, the tactile sense of the user's finger 100 is generated by the AC voltage applied to the conductive layer 402. Accordingly, it is possible to present the tactile sense in response to the position of the finger 100 by detecting the position of the finger 100 in the one-dimensional position sensor 403 as in the case where a two-dimensional position sensor is provided.

Figure 5B:
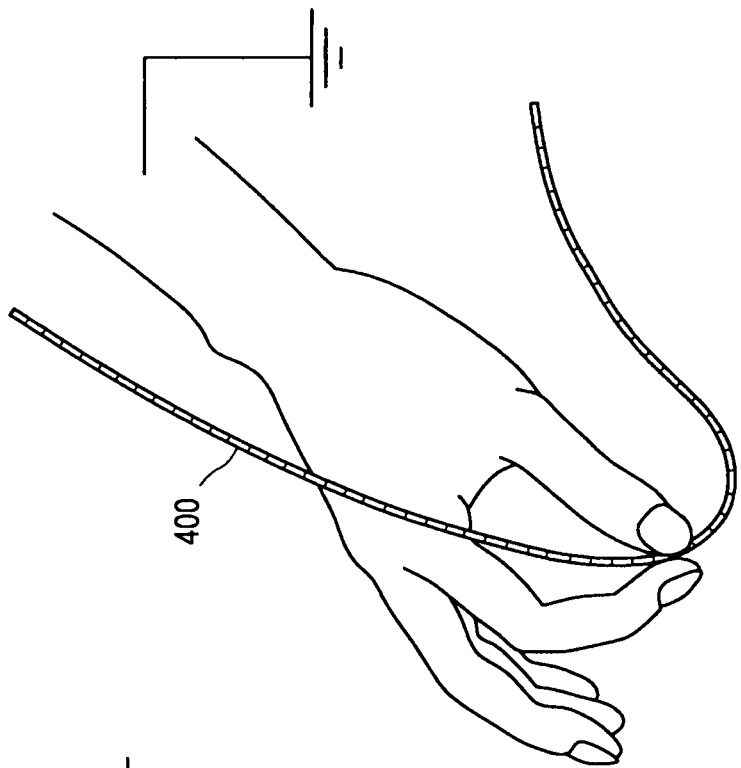
FIGS. 5A to 5C are schematic diagrams showing an example in which a main configuration for generating a tactile sense is provided in a one-dimensional direction.
Figure 5A:
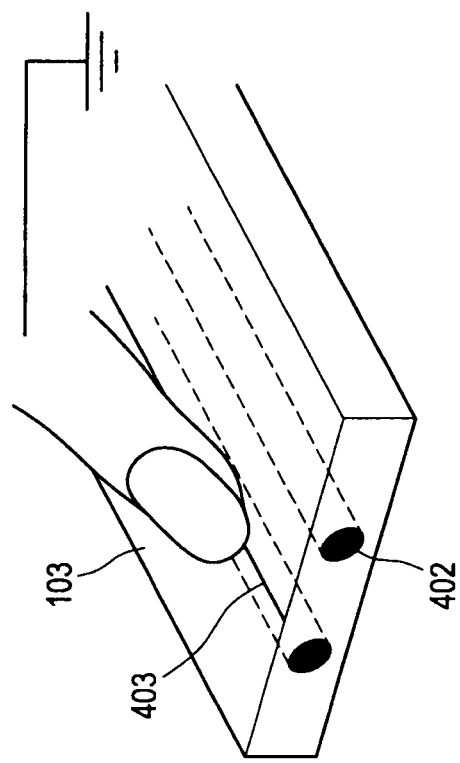
Figure 5C:
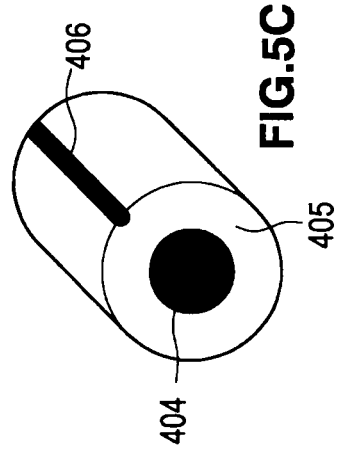

FIGS. 5B and 5C show an example of a configuration of presenting a tactile sense including a bendable wire 400. The user holds the wire 400 by fingers 100 of his/her hand and moves the fingers 100 along the wire 400. As shown in FIG. 5C, the wire 400 is formed in a two-layer structure of a conductive layer 404 and an insulating layer 405. The conductive layer 404 extending in the one-dimensional direction is provided inside the insulating layer 405 of the wire 400, and the conductive layer 404 is covered by the insulating layer 405. As in FIG. 1, the fingers 100 have the ground potential. If an AC voltage for generating the tactile sense is applied to the conductive layer 404 and the user moves the fingers 100 along the wire 400, the tactile sense is generated on the user's fingers 100. In FIG. 5C, a position sensor 406, which detects a position of the fingers 100, is provided in the insulating layer 405. Even in this configuration, it is possible to present the tactile sense in response to the position of the fingers 100 by detecting the position of the fingers 100 in the position sensor 406.

Even in the examples of FIGS. 5A, 5B, and 5C like the case of FIG. 4, a pressure-sensitive sensor may be provided. When the user pushes the stripe or the wire 400, the pressure-sensitive sensor senses the push, so that the processing unit 107 can execute predetermined processing as in the case where a manipulating member such as a button is manipulated.

[5. Configuration Example of Video Projecting System]

Figure 6:
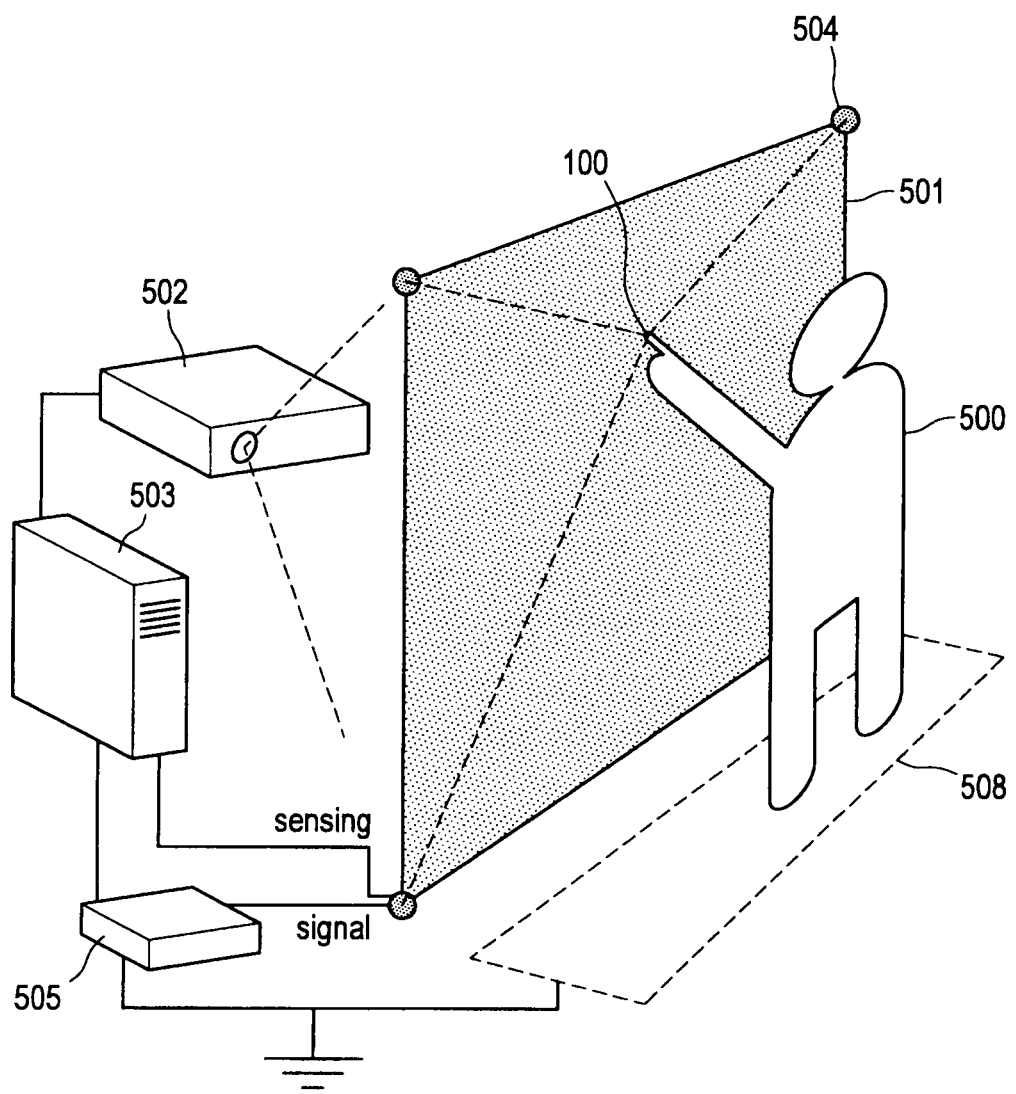
FIG. 6 is a schematic diagram showing a video projecting system according to an embodiment of the present invention.

FIG. 6 is a schematic diagram showing a video projecting system according to this embodiment. In the example of FIG. 6, a projector 502 projects a screen on a wall surface on which a touch sensor 501 extending in a vertical direction is provided. The touch sensor 501 can be configured by stacking the glass sheet 304, the electrode sheet 303, and the insulator 305 as in the above-described touch panel 301. If the finger 100 of a user 500 is in contact with the insulator 305 of a surface of the touch sensor 501, the electrostatic capacitance with the electrode sheet 303 is varied and thus the electrostatic capacitance of each electrode 504 of the electrode sheet 303 is varied in response to a position of the finger 100 of the user 500. Thus, it is possible to detect the position of the finger 100 of the user 500 in response to the electrostatic capacitance detected by each electrode 504.

Information of the position of the finger 100 of the user 500 is transmitted to a control device 503. The control device 503 outputs a command to a voltage control device 505 in response to the position of the finger 100 of the user 500. The voltage control device 505 applies an AC voltage corresponding to the position of the finger 100 of the user 500 to the electrode sheet 303 of the touch sensor 501. The control device 503 outputs a command to the projector 502 in response to the position of the finger 100 of the user 500, and updates a projected image.

A pad 508 to which a ground potential is applied is laid before a wall surface on which the touch sensor 501 is provided. The user 500 stands on the pad 508, so that a user's body has the ground potential. By this configuration, it is possible to generate a tactile sense in response to the position of the finger 100 of the user 500.

Even in the example of FIG. 6, position detection may be performed using a sensor, which detects a position by performing image processing for an image captured by a camera, a laser sensor, an infrared sensor, or other technology in place of the touch sensor 501.

[6. Configuration Example of External Appearance of Information Presenting Device]

Figure 7:
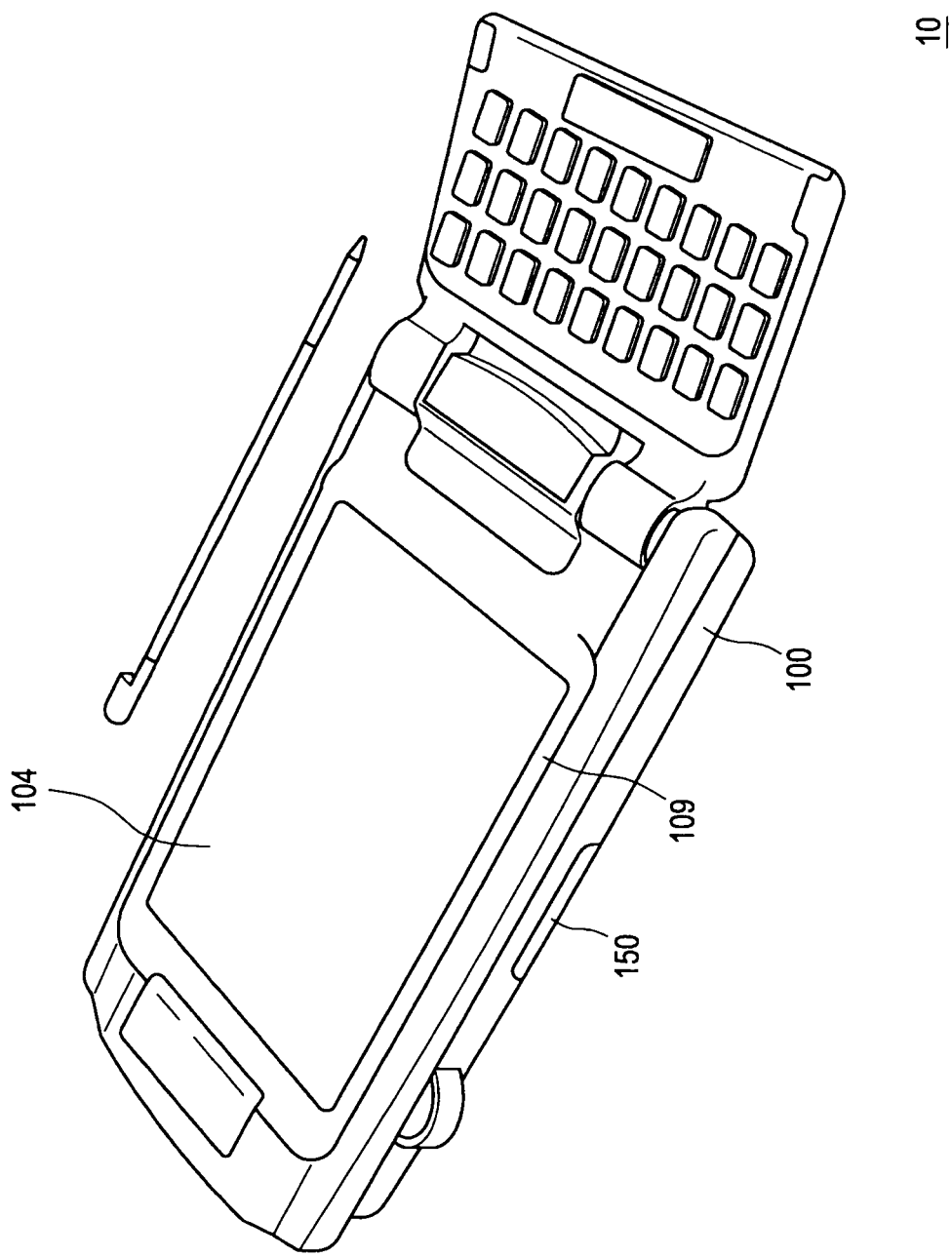
FIG. 7 is a perspective view showing an example of an information presenting device according to this embodiment.

FIG. 7 is a perspective view showing an example of the external appearance of the information presenting device 10 according to this embodiment. For example, the information presenting device 10 may be an information terminal having a mobile phone function such as a smart phone. A chargeable battery is arranged on the back of the information presenting device 10. A negative electrode of the battery has a ground potential, and a conductive plate 150 connected to the negative electrode is exposed on the backside of the information presenting device 10. Thereby, since the conductive plate 150 is in contact with the user's hand if the user holds the information presenting device 10, the user can have the ground potential. A configuration in which the user has the ground potential can adopt various types of methods. A connection of the ground potential of the information presenting device 10 to the user is not indispensible. For example, if the information presenting device 10 is arranged indoors, the user may have the ground potential by connecting a component of metal such as a pipe within a building, which is not directly related to the information presenting device 10, to the user.

The conductive layer 102 of FIG. 1 may be provided by printing a conductive material on paper. In this case, a paper surface may function as the insulating layer 103. The conductive layer 102 may be configured on a fabric surface. Thereby, it is possible to present a tactile sense from an accessory formed of paper, clothing, or the like. The above-described configuration is applicable to, for example, a computer system or a ubiquitous computing system, which can be mounted as clothing, by providing the position sensor 104 and the various sensors 105. If the conductive layer 102 is provided on clothing, the user can have the ground potential by further providing the ground potential on the clothing and making contact with the user's body.

According to this embodiment as described above, it is possible to provide the user with information through a tactile sense since the user has the ground potential and an AC voltage is applied to the conductive layer 102 when the user is in contact with the upper side of the insulating layer 103.

Preferred embodiments of the present invention have been described above in detail with reference to the appended drawings, but the present invention is not limited thereto. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2010-088281 filed in the Japan Patent Office on Apr. 7, 2010, the entire content of which is hereby incorporated by reference.

What is claimed is:

1. An information presenting device comprising:
   a conductive layer to which an AC voltage is applied;
   an insulating layer covering the conductive layer, the insulating layer presenting a tactile sense when a part of a body of a user set to a ground potential is in contact with the insulating layer at a contact position; and
   circuitry that computes a magnitude of the tactile sense according to a plurality of distances along the insulating layer, each of the distances being a distance between the contact position and a different one of a plurality of predetermined reference positions on a border of the insulating layer.

2. The information presenting device according to claim 1, further comprising:
   a display arranged integrally with or separately from a stack structure including the conductive layer and the insulating layer, wherein
   the display is configured to display information.

3. The information presenting device according to claim 2, wherein the stack structure including the conductive layer and the insulating layer is formed of a transparent material and is arranged to cover a display surface of the display.

4. The information presenting device according to claim 2, further comprising:
   a battery configured to drive the display, wherein
   a ground potential of the battery is connected to the body of the user.

5. The information presenting device according to claim 1, further comprising:
   a position sensor configured to detect a position of the part of the body of the user on the insulating layer.

6. The information presenting device according to claim 5, wherein the position sensor is configured to detect the position of the part of the body of the user based on a variation of electrostatic capacitance generated in the conductive layer when the part of the body of the user is in contact with the insulating layer.

7. The information presenting device according to claim 5, wherein the position sensor is configured to detect the position of the part of the body of the user by optical detection.

8. The information presenting device according to claim 1, further comprising:
   control circuitry that controls an amplitude or frequency of the AC voltage applied to the conductive layer.

9. The information presenting device according to claim 1, further comprising:
   a position sensor configured to detect a position of the part of the body of the user on the insulating layer; and
   control circuitry that controls an amplitude or frequency of the AC voltage applied to the conductive layer based on the position of the part of the body of the user.

10. The information presenting device according to claim 1, further comprising:
a pressure-sensitive sensor configured to detect a pressure force when the part of the body of the user is in contact with the insulating layer.

11. The information presenting device according to claim 1, wherein a stack structure including the conductive layer and the insulating layer is formed in a planar shape extending in a two-dimensional direction.

12. The information presenting device according to claim 1, wherein a stack structure including the conductive layer and the insulating layer is formed in a stripe shape or a line shape extending in a one-dimensional direction.

13. The information presenting device according to claim 1, wherein a stack structure including the conductive layer and the insulating layer is formed of a deformable material.

14. The information presenting device according to claim 1, further comprising:
an electrode to which the ground potential is applied, wherein
a potential of the user is set commonly with the ground potential of the electrode.

15. A tactile sense presenting method for use in an information presenting device having a conductive layer and an insulating layer which covers the conductive layer and is in contact with a part of a body of a user set to a ground potential, the method comprising:
applying an AC voltage to the conductive layer;
detecting a contact position of the part of the body of the user in contact with the insulating layer;
computing a magnitude of a tactile sense according to a plurality of distances along the insulating layer, each of the distances being a distance between the contact position and a different one of a plurality of predetermined reference positions on a border of the insulating layer; and
presenting the tactile sense by controlling an amplitude or frequency of the AC voltage applied to the conductive layer based on the computed magnitude.

16. A tactile sense presenting method for use in an information presenting device having a conductive layer, an insulating layer which covers the conductive layer and is in contact with a part of a body of a user set to a ground potential, and a display configured to display information, the display arranged integrally with or separately from a stack structure including the conductive layer and the insulating layer, the method comprising:
applying an AC voltage to the conductive layer;
detecting a contact position of the part of the body of the user in contact with the insulating layer;
computing a magnitude of a tactile sense according to a plurality of distances along the insulating layer, each of the distances being a distance between the contact position and a different one of a plurality of predetermined reference positions on a border of the insulating layer; and
presenting the tactile sense by controlling an amplitude or frequency of the AC voltage applied to the conductive layer based on the computed magnitude.

17. A non-transitory computer readable medium in an information presenting device including a conductive layer and an insulating layer which covers the conductive layer and is in contact with a part of a body of a user set to a ground potential, having stored thereon computer executable instructions that when executed by the information presenting device, cause the information presenting device to:
apply an AC voltage to the conductive layer;
detect a contact position of the part of the body of the user in contact with the insulating layer;
compute a magnitude of a tactile sense according to a plurality of distances along the insulating layer, each of the distances being a distance between the contact position and a different one of a plurality of predetermined reference positions on a border of the insulating layer; and
present the tactile sense by controlling an amplitude or frequency of the AC voltage applied to the conductive layer based on the computed magnitude.

18. A non-transitory computer readable medium in an information presenting device including a conductive layer, an insulating layer which covers the conductive layer and is in contact with a part of a body of a user set to a ground potential, and a display configured to display information, the display arranged integrally with or separately from a stack structure including the conductive layer and the insulating layer, having stored thereon computer executable instructions that when executed by the information presenting device, cause the information presenting device to:
apply an AC voltage to the conductive layer;
detect a contact position of the part of the body of the user in contact with the insulating layer;
compute a magnitude of a tactile sense according to a plurality of distances along the insulating layer, each of the distances being a distance between the contact position and a different one of a plurality of predetermined reference positions on a border of the insulating layer; and
present the tactile sense by controlling an amplitude or frequency of the AC voltage applied to the conductive layer based on the computed magnitude.

* * * * *